Feb. 27, 1940.　　　　E. C. BROWN　　　　2,191,749
TRAILER HITCH
Filed Feb. 7, 1938　　　　2 Sheets-Sheet 1
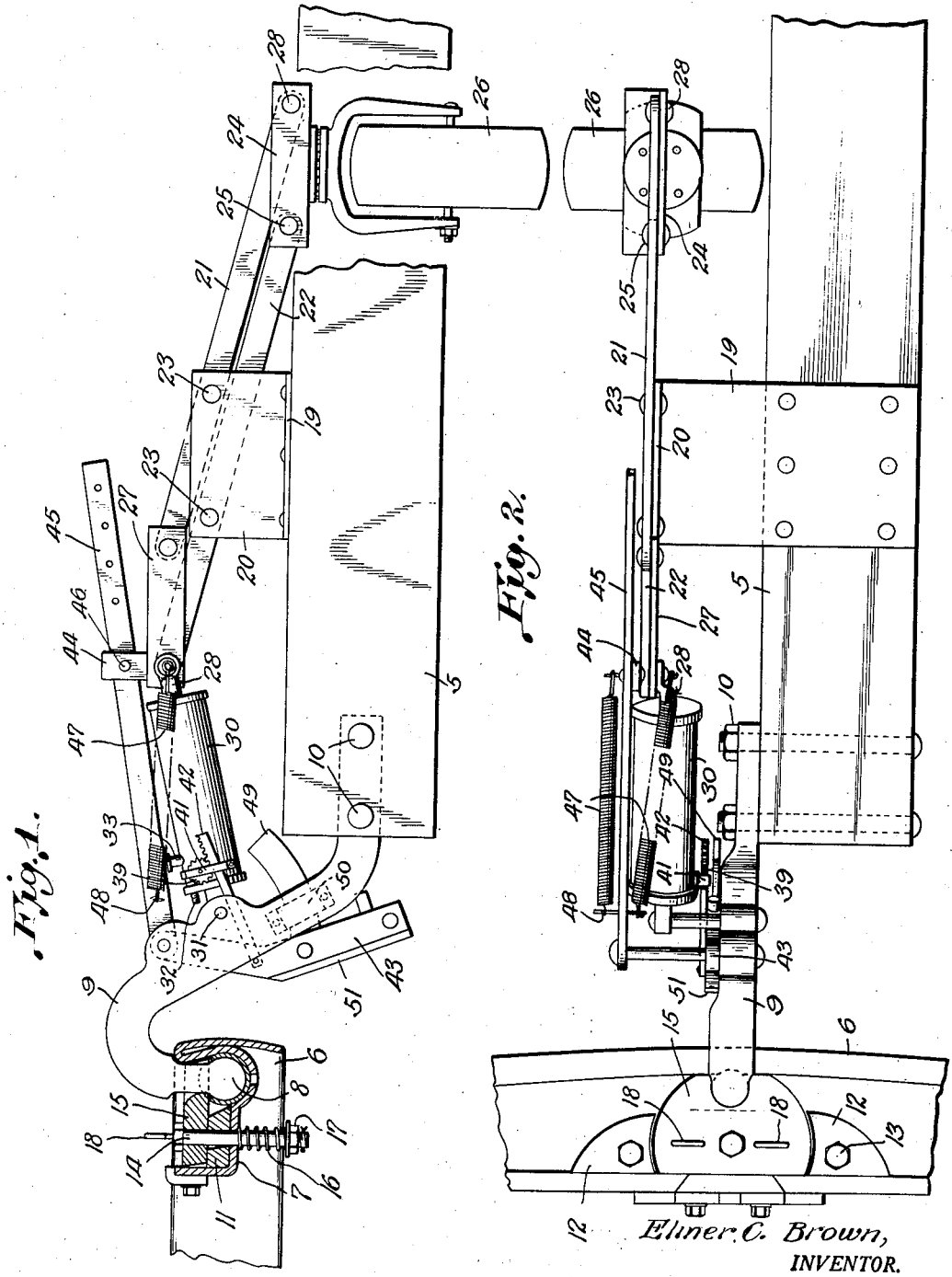
Eliner C. Brown,
INVENTOR.
BY Ch Snow Leo
ATTORNEYS.

Feb. 27, 1940. E. C. BROWN 2,191,749
TRAILER HITCH
Filed Feb. 7, 1938 2 Sheets-Sheet 2
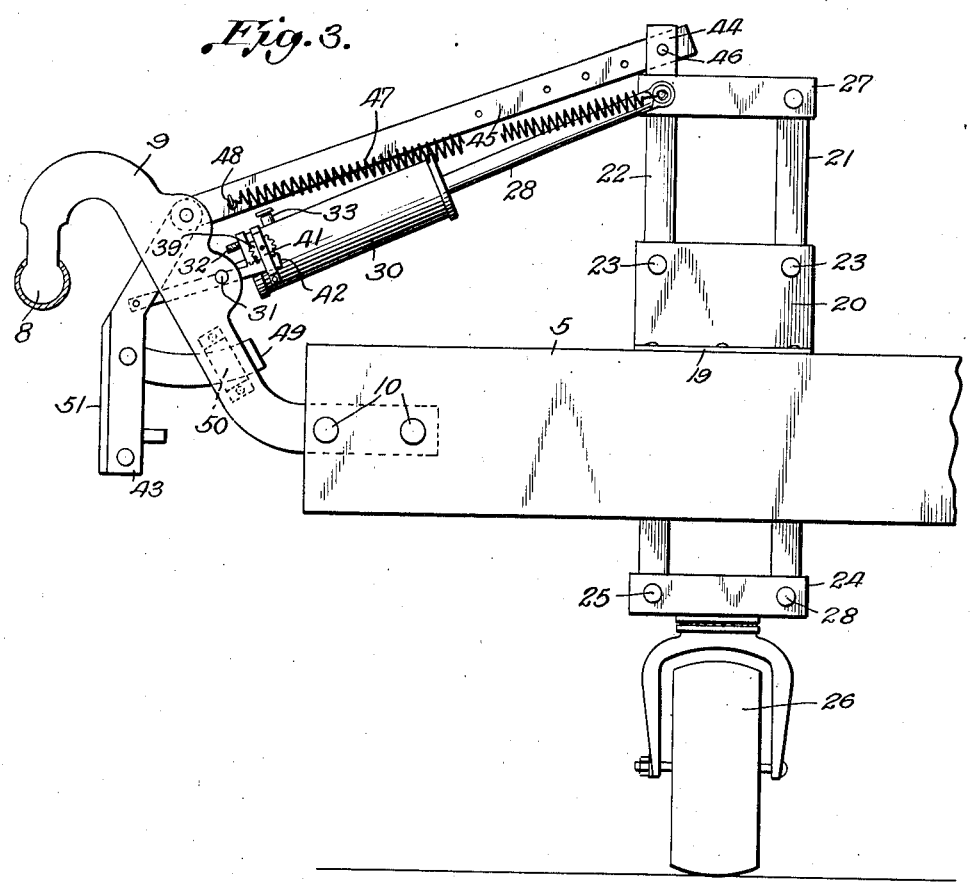
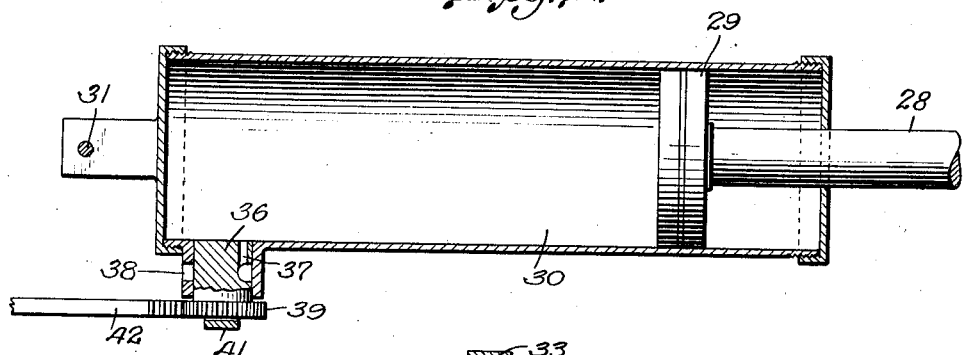
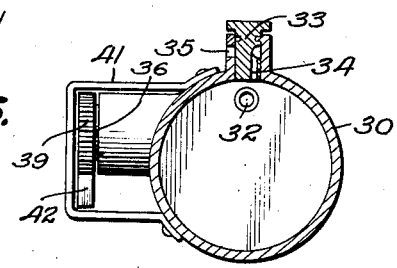
Elmer C. Brown,
INVENTOR.
BY *CA Snow & Co.*
ATTORNEYS.

Patented Feb. 27, 1940

2,191,749

UNITED STATES PATENT OFFICE 2,191,749

TRAILER HITCH

Elmer C. Brown, Donnelly, Idaho

Application February 7, 1938, Serial No. 189,232

2 Claims. (Cl. 280—33.17)

This invention relates to a trailer hitch, the primary object of the invention being to provide a hitch of this character which will securely couple a trailer to a motor vehicle in such a manner as to insure against the trailer becoming disconnected from the motor vehicle, but at the same time will permit free movement of the trailer with respect to the towing vehicle.

An important object of the invention is to provide a trailer hitch or coupling of this character including a vertically movable caster wheel for supporting the front end of the trailer when the trailer has been disconnected from the motor vehicle, means being provided for automatically elevating the caster wheel when it is desired to move the trailer with the towing vehicle.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of a trailer hitch constructed in accordance wtih the invention, the caster or supporting wheel of the trailer, being shown in its elevated position.

Figure 2 is a plan view of the trailer hitch.

Figure 3 is a side elevational view of one section of the trailer hitch, the caster being shown as in its extended or supporting position.

Figure 4 is a longitudinal sectional view through the cylinder of the pneumatic caster operating means.

Figure 5 is a transverse sectional view through the cylinder and manually controlled valve employed in bleeding the cylinder.

Referring to the drawings in detail, the reference character 5 designates the tongue of a trailer and the reference character 6 designates the bumper mounted at the rear of the motor vehicle, employed in towing the trailer.

The bumper 6 is provided with a downwardly extended offset portion 7 recessed to receive the head 8 of the arm 9, which is connected to the trailer tongue 5, as by means of the bolts 10. Mounted within the downwardly extended portion 7 is a spacing block 11 to which the plates 12 are bolted, as by means of bolts 13. The spacing block 11 is formed with a central opening through which the bolt 14 extends, the bolt also passing through an opening formed substantially centrally of the locking disk 15 which is formed with a cut-out portion extending inwardly from the edge thereof, the cut-out portion being of a size to accommodate the neck of the arm 9, at a point adjacent to the head 8, as clearly shown by Figure 1 of the drawings. Thus it will be seen that when the locking disk 15 is moved to a position as shown by Figure 2 of the drawings, the head 8 of the arm 9 will be securely held within the coupling, but will be permitted to swing freely to compensate for movement of one vehicle with respect to the other. A coiled spring indicated by the reference character 16 is mounted on the bolt 14, the bolt being provided with a nut 17 against which one end of the spring 15 16 engages, the upper end of the spring 16 contacting with the bottom of the downwardly extended offset portion 7, with the result that the bolt is normally held downwardly to the limit of its downward movement, or in a position as shown by Figure 1 of the drawings. When it is desired to release the coupling, it is only necessary to elevate the locking disk 15, whereupon the disk may be slightly rotated to cause the cut-out portion thereof to register with the opening between the bars of the bumper, with the result that the head may now be elevated or disconnected. In order that the locking disk 15 may be readily and easily rotated to release or connect the arm 9 of the coupling, eye members indicated by the reference character 18 are provided on the locking disk, which eye members provide means whereby the operator may lift the disk 15, releasing the trailer.

A plate indicated by the reference character 19 is secured to the upper surface of the tongue 5, the plate being of a width to extend an appreciable distance beyond the side edge of the tongue 5, the free end of the plate being formed into an upstanding flange 20 which provides a bracket for the arms 21 and 22 forming a part of the caster operating mechanism, to be hereinafter more fully described. These arms 21 and 22 are pivotally connected with the upstanding flange 20, at 23, the lower ends of the arms 21 and 22 being connected with the plate 24 at 25. This plate 24 provides the upper portion of the caster wheel indicated by the reference character 26.

Pivotally connecting the upper ends of the bars 21 and 22 is a bar 27 to which the piston rod 28 is connected, the piston rod 28 carrying the piston 29 at its inner end, which piston operates in the cylinder 30 which has pivotal connection with the arm 9, at 31. Thus it will be seen that when the piston 29 moves to one end of the cylinder, to extend the piston rod 28, the upper ends of the arms 21 and 22 will be swung from a position as shown by Figure 1 of the drawings, to the position as shown by Figure 3, whereupon the caster will be moved to its active or supporting position. At one end of the cylinder is a valve stem 32 to which a hydraulic pump is connected, in order to fill the cylinder 30 with fluid, to force the piston 29 towards the outer end of the cylinder 30. The reference character 33 designates a manually controlled valve which is provided with a passageway 34 adapted to be moved to align with the opening 35 of the valve housing, whereupon the fluid in the cylinder may exhaust.

Another valve indicated by the reference character 36 is provided with a passageway 37, the valve being so constructed that when the passageway 37 is moved to a position to align with the opening 38, fluid will exhaust from the cylinder 30. This valve 36, is provided with a gear 39 on the stem 40 thereof, the gear being supported within the bracket 41 secured to the side of the cylinder. This valve 36 is actuated by the movement of the rack bar 42, which cooperates with the gear 39, the rack bar being pivotally connected to the bar 43 that is engaged by the bumper of the towing vehicle, when the towing vehicle is backed into the trailer hitch.

Supported on the bar 27, is a guide bar 44. Connected with the bar 43 at the upper end of the bar is an arm 45 which is supported by the guide bar 44, the arm 45 being provided with spaced openings adapted to align with an opening of the bar 44 to accommodate the pin 46, whereby the arm 45 may be held in various positions of adjustment. Connected with the guide bar 44 are coiled springs 47, which springs 47 also connect with the bar 27 at 48. When the arms 21 and 22 have been moved from the position shown by Figure 1, to the position as shown by Figure 3, it is obvious that the coiled springs 47 will be placed under tension to return the arms 21 and 22 to their inactive positions or to positions wherein the caster wheel is elevated, when the air pressure within the cylinder 30 has been relieved.

Extending rearwardly from the bar 43, is an arm 49 that operates through the guide strap 50, carried by the arm 9. This arm 49 acts to insure the true rearward movement of the bar 43, when it is engaged by the bumper of the towing vehicle, to actuate the valve of the cylinder. The face of the bar 43 is provided with a covering of cushioning material, indicated by the reference character 51. From the foregoing it will be obvious that due to the construction shown and described, it is only necessary to attach a suitable air hose to the valve stem 32, to supply air to the cylinder 30. As fluid enters the cylinder 30, the piston 29 is moved towards the outer end of the piston, with the result that the upper ends of the arms 21 and 22 are swung upwardly and the lower ends thereof, which carry the caster 26, will be moved downwardly, moving the caster 26 into engagement with the ground surface to support the forward end of the trailer.

It will of course be obvious that prior to this movement, the locking disk 15 will be moved to release the head 8 of the arm 9, allowing the tongue 5 of the trailer to be elevated as the caster moves to its operative position.

Should it be desired to elevate the caster, prior to the coupling of the towing vehicle to the trailer, it is only necessary to back the towing vehicle until the rear bumper thereof engages the bar 43. Further movement of the bar 43 will operate to move the valve 36 to release the fluid pressure within the cylinder allowing the springs 47 to act, drawing the piston rod 28 and piston 29 carried thereby, inwardly to the opposite end of the cylinder. The bar 9 gradually lowers until the head 8 moves into the coupling carried by the towing vehicle bumper.

After the head 8 has been properly seated, the locking disk is operated to securely lock the head against accidental displacement.

I claim:

1. A coupling for coupling a trailer to a towing vehicle, comprising an arm connected to the tongue of the trailer, a head on the free end of the arm, a socket member carried by the bumper of the towing vehicle and adapted to accommodate the head of the arm, a locking disk mounted on the socket member and adapted to move to a position to engage the head within the socket member, a bolt on which the locking disk is pivotally mounted, a spring on the bolt adapted to normally hold the locking disk against movement, and said disk adapted to be moved upwardly against the action of the spring, releasing the head and arm.

2. In a coupling for connecting a trailer to the bumper of a towing vehicle, the bumper having a downwardly extended offset portion providing a socket member and a shoulder, an arm connected to the tongue of the trailer, a head on the arm and adapted to fit in the socket member, a locking disk fitted in the offset portion and adapted to engage the head and shoulder holding the head within the socket member, and yieldable means for normally urging the locking disk to its locking position.

ELMER C. BROWN.